(12) United States Patent
Nakajima et al.

(10) Patent No.: US 8,487,207 B2
(45) Date of Patent: Jul. 16, 2013

(54) APPARATUS AND METHOD FOR CUTTING HOLLOW CYLINDRICAL WORKPIECE

(75) Inventors: Katsuyuki Nakajima, Utsunomiya (JP); Daisuke Koshino, Utsunomiya (JP); Akihiro Nemoto, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 710 days.

(21) Appl. No.: 12/686,632

(22) Filed: Jan. 13, 2010

(65) Prior Publication Data

US 2010/0200551 A1 Aug. 12, 2010

(30) Foreign Application Priority Data

Feb. 10, 2009 (JP) ................................. 2009-028416

(51) Int. Cl.
*B23K 26/00* (2006.01)
(52) U.S. Cl.
USPC .............. 219/121.6; 219/121.67; 219/121.72; 219/159
(58) Field of Classification Search
USPC ..... 219/121.6, 121.67, 121.72, 158; 129/159; 83/78
See application file for complete search history.

(56) References Cited

U.S. PATENT DOCUMENTS

| 3,206,180 A * | 9/1965 | Grubish .......................... 266/57 |
| 5,073,694 A * | 12/1991 | Tessier et al. ............... 219/121.7 |
| 5,424,508 A * | 6/1995 | Swain et al. ............. 219/121.84 |
| 2004/0232120 A1* | 11/2004 | Wessner ................... 219/121.67 |

FOREIGN PATENT DOCUMENTS

| JP | 59-062879 U | 4/1984 |
| JP | 63-053912 B2 | 10/1988 |
| JP | 2005-297074 A | 10/2005 |

* cited by examiner

Primary Examiner — Michael Trinh
(74) Attorney, Agent, or Firm — Arent Fox LLP

(57) ABSTRACT

A rotatable workpiece holder for holding a hollow cylindrical workpiece thereon functions as a chiller for cooling the hollow cylindrical workpiece. A coolant, e.g., water, is supplied to the hollow cylindrical workpiece through second coolant passages and branch passageways defined in the workpiece holder, thereby cooling the hollow cylindrical workpiece. The coolant forms a film in a clearance between the outer surface of an annular side wall of the workpiece holder and the inner circumferential surface of the hollow cylindrical workpiece.

8 Claims, 5 Drawing Sheets

APPARATUS AND METHOD FOR CUTTING HOLLOW CYLINDRICAL WORKPIECE

CROSS-REFERENCE TO RELATED APPLICATION

This application is based upon and claims the benefit of priority from Patent Application No. 2009-028416 filed on Feb. 10, 2009, in the Japan Patent Office, of which the contents are incorporated herein by reference.

BACKGROUND OF THE INVENTION

1. Field of the Invention

The present invention relates to an apparatus and a method for cutting a hollow cylindrical workpiece of metal with a laser beam to produce a plurality of metal rings.

2. Description of the Related Art

Some power transmitting belts for use in continuously variable transmissions for automobiles are in the form of a laminated ring belt comprising a stack of metal rings. For example, as shown in Japanese Laid-Open Patent Publication No. 2005-297074, the metal rings of the laminated ring belt are produced by joining the opposite ends of a rectangular thin sheet of metal to form a hollow cylindrical drum (hollow cylindrical workpiece) and then slicing the drum into a plurality of metal rings each having a predetermined width.

It has heretofore been customary to slice the drum with a cutter such as a grinding wheel, a cutting tool, or the like. Attempts have also been made to use a laser beam to cut a hollow cylindrical drum as disclosed in Japanese Patent Publication No. 63-053912 and Japanese Laid-Open Utility Model Publication No. 59-062879.

When the drum is cut by the laser beam, the temperature of the drum rises due to the laser beam applied to the drum. Since the laser beam is relatively high in temperature, the temperature of the drum tends to increase even at those positions which are relatively spaced from the position where the laser beam is applied to the drum, occasionally to such a degree that the heated regions melt away.

After the laser beam stops being applied, the molten regions are solidified again into a mass referred to as dross. The drum thus takes a shape having raised regions due to the dross. The metal rings that are cut from the drum with the raised regions cannot properly be stacked one on another because the dross is kept in physical interference with and pressed against the metal rings.

To alleviate the above drawback, the metal rings may be machined to remove the dross in a subsequent machining process. However, since the subsequent machining process adds to man-hours required to produce desired metal rings, the efficiency with which to manufacture the laminated ring belt is lowered.

SUMMARY OF THE INVENTION

It is a general object of the present invention to provide an apparatus and a method for cutting a hollow cylindrical workpiece of metal into a plurality of metal rings with a reduced amount of dross on the metal rings.

According to an embodiment of the present invention, there is provided an apparatus for cutting a hollow cylindrical workpiece of metal with a laser beam to produce a plurality of metal rings, comprising a rotatable workpiece holder for holding the hollow cylindrical workpiece thereon, the rotatable workpiece holder having a side wall insertable in a through hole of the hollow cylindrical workpiece and functioning as a chiller for cooling the hollow cylindrical workpiece when the side wall is inserted in the through hole of the hollow cylindrical workpiece, the workpiece holder having a coolant passage defined longitudinally therein for passing a coolant therethrough along the side wall and a plurality of branch passageways which extend from the coolant passage to an outer surface of the side wall, whereby the coolant cools the hollow cylindrical workpiece to be cut by the laser beam when the coolant flows from the coolant passage through the branch passageways between the outer surface of the side wall and an inner circumferential surface of the hollow cylindrical workpiece.

The apparatus thus constructed is capable of efficiently cooling the hollow cylindrical workpiece while the hollow cylindrical workpiece is being cut by the laser beam because the rotatable workpiece holder functions as a chiller for cooling the workpiece and the coolant is supplied to the hollow cylindrical workpiece through the coolant passage and the branch passageways.

When the apparatus is in operation, the region of the hollow cylindrical workpiece which is irradiated with the laser beam is heated by the laser beam and the remainder of the hollow cylindrical workpiece is efficiently cooled against an undue temperature rise which would be caused by thermal conduction. Therefore, the remainder of the hollow cylindrical workpiece other than the heated region thereof is prevented from being melted, thereby significantly reducing the amount of molten metal and hence dross produced from the hollow cylindrical workpiece.

According to the present invention, therefore, the apparatus is capable of avoiding an excessive production of molten metal from the hollow cylindrical workpiece and hence dross from molten metal.

Preferably, the laser beam should be applied to the hollow cylindrical workpiece at a position aligned with an annular array of the branch passageways. Specifically, the apparatus should preferably further comprise laser beam applying means which is stopped at a position aligned with an annular array of the branch passageways for applying the laser beam to the hollow cylindrical workpiece to cut the hollow cylindrical workpiece at the position by the laser beam (L).

When the cutting of the hollow cylindrical workpiece is finished, the branch passageways along which the hollow cylindrical workpiece is cut are exposed and the coolant in the branch passageways leaks out. Any molten metal and dross which are produced from the hollow cylindrical workpiece are discharged together with the coolant and hence are prevented from remaining at the cut edge or the like of the hollow cylindrical workpiece.

When the hollow cylindrical workpiece is cut by the laser beam, the workpiece holder should preferably rotate at a peripheral speed in a range from 740 to 2000 m/minute. If the workpiece holder rotates at a peripheral speed in the range from 740 to 2000 m/minute, then the hollow cylindrical workpiece is supplied with a sufficient level of laser beam energy to cut the hollow cylindrical workpiece. In the above rotational speed range, the amount of sublimed metal gas which is produced is large, and the amount of molten metal which is produced is small.

The apparatus should preferably further comprise suction means for drawing in the coolant which leaks out from a cut edge of the hollow cylindrical workpiece when the hollow cylindrical workpiece is cut by the laser beam. When the suction means draws in the coolant, the coolant and hence molten metal and dross which are included in the coolant can easily be removed from the cut edge of the hollow cylindrical workpiece.

The apparatus should further comprise carrier medium discharge means for discharging a carrier medium which carries the coolant which leaks out from the cut edge of the hollow cylindrical workpiece, toward the suction means. The carrier medium discharge means makes it possible to remove more efficiently the coolant and hence molten metal and dross which are included in the coolant from the cut edge of the hollow cylindrical workpiece.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

An apparatus and a method for cutting a hollow cylindrical workpiece according to a preferred embodiment of the present invention will be described in detail below with reference to the accompanying drawings.

Figure 1:
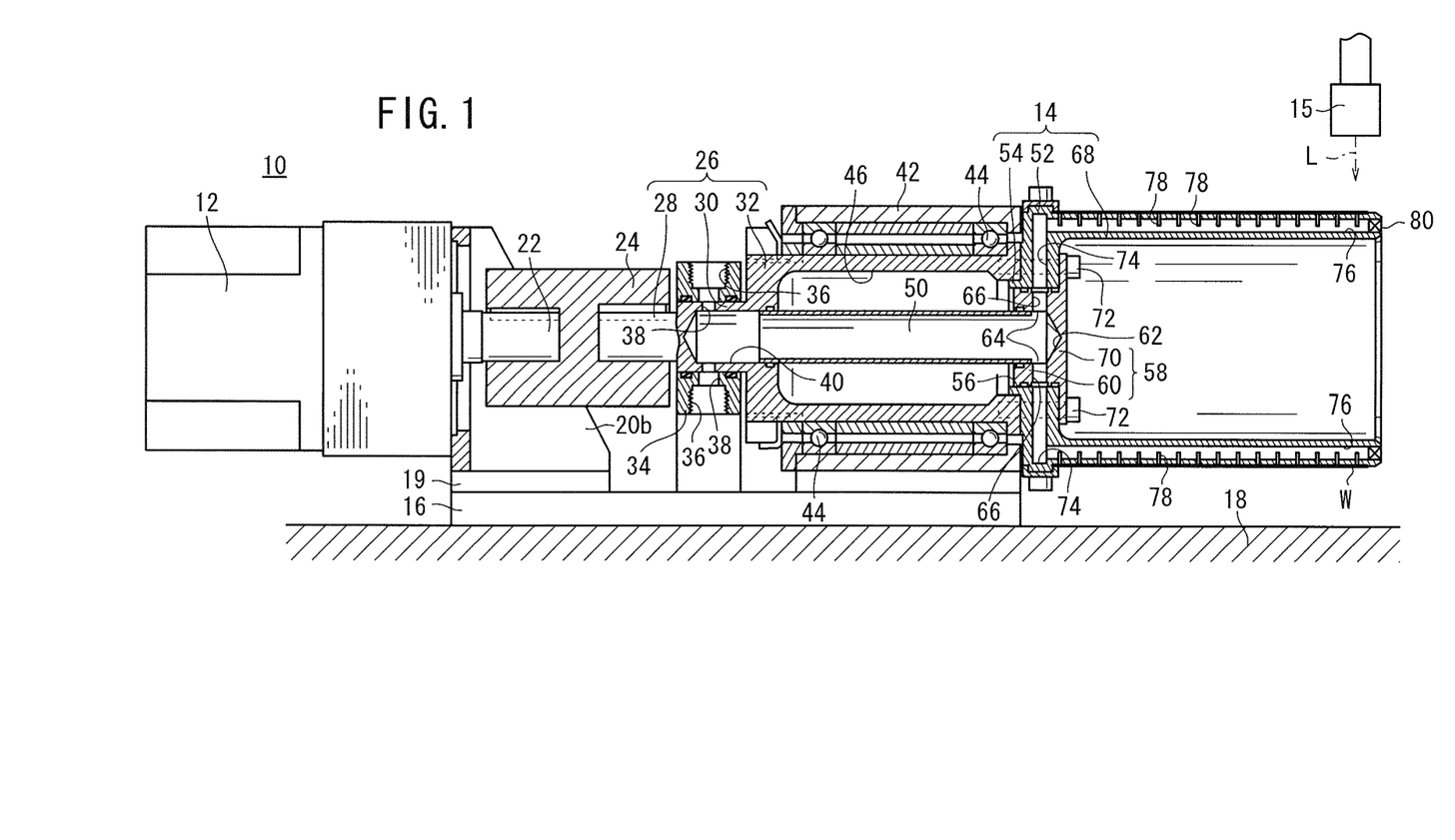
FIG. 1 is a side elevational view, partly in cross section, of an apparatus for cutting a hollow cylindrical workpiece according to a preferred embodiment of the present invention.
Figure 2:
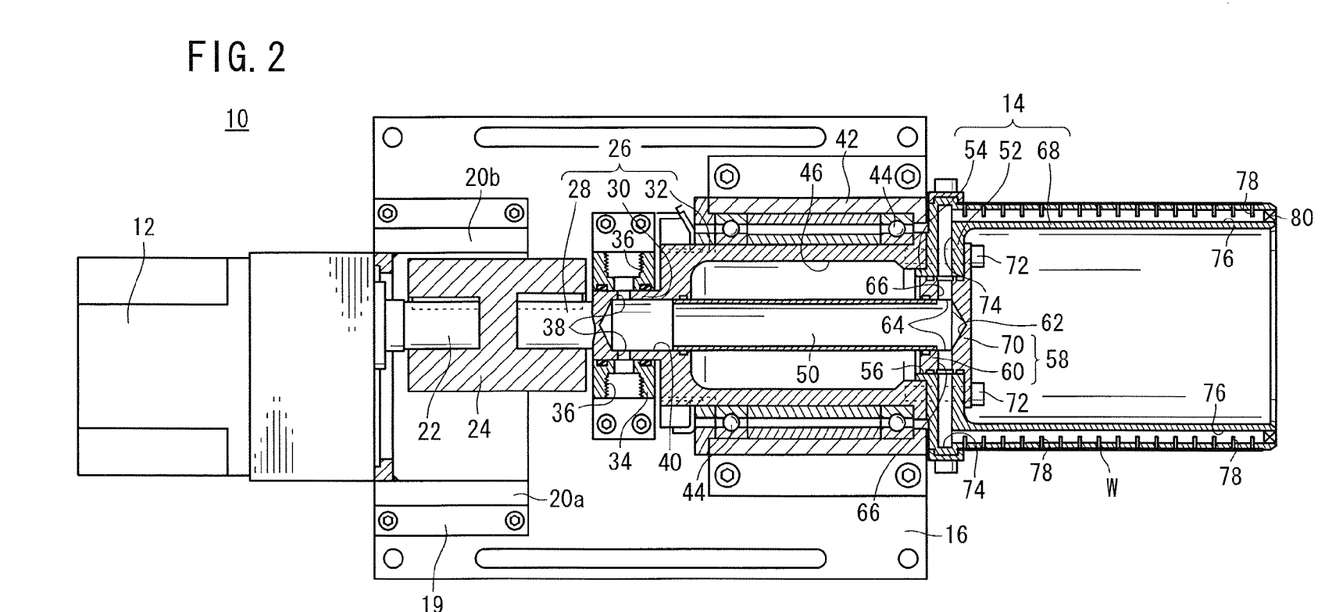
FIG. 2 is a plan view, partly in cross section, of the apparatus for cutting a hollow cylindrical workpiece shown in FIG. 1.

FIG. 1 is a side elevational view, partly in cross section, of an apparatus 10 for cutting a hollow cylindrical workpiece according to a preferred embodiment of the present invention, and FIG. 2 is a plan view, partly in cross section, of the apparatus 10 for cutting a hollow cylindrical workpiece shown in FIG. 1. As shown in FIGS. 1 and 2, the apparatus 10 comprises a workpiece holder 14 which is to be inserted in a through hole defined in a hollow cylindrical workpiece W and which is rotatable by a motor 12, and a machining head 15 serving as a laser beam applying means for applying a laser beam L to the hollow cylindrical workpiece W at given positions thereon.

As shown in FIG. 1, the apparatus 10 includes a base 16 mounted on a floor 18 of a machining station. The apparatus 10 also includes two support posts 20a, 20b (see FIG. 2, only the support post 20b is illustrated in FIG. 1) interconnected by a connector 19 in the form of a flat plate and vertically mounted on the base 16 by the connector 19. The motor 12 is coupled to and fixed by the support posts 20a, 20b.

The motor 12 has a rotational shaft 22 as its output shaft fixedly fitted in an end of a joint 24. A shaft 28 coaxially mounted on an inner tubular member 26 is fixedly fitted in an opposite end of the joint 24 in coaxial relation to the rotational shaft 22. Therefore, when the motor 12 is energized, the inner tubular member 26 rotates about its own axis.

The inner tubular member 26 comprises a small-diameter portion 30 and a large-diameter portion 32. The shaft 28 is connected to the small-diameter portion 30. A pipe joint socket 34 is slidably fitted over the small-diameter portion 30.

The pipe joint socket 34 has eight radial joint connectors 36 angularly spaced at 45° around the small-diameter portion 30. The joint connectors 36 are connected to respective pipe joints (not shown) which are connected to pipes for introducing a coolant.

The small-diameter portion 30 has eight radial inlet holes 38 defined therein that are angularly spaced at 45° around its own axis. The inlet holes 38 extend radially inwardly from an outer surface of the small-diameter portion 30 toward the center thereof. The inlet holes 38 communicate with a first inner hole 40 that is defined in the small-diameter portion 30 and extends axially from the small-diameter portion 30 into the large-diameter portion 32 to a position slightly beyond the boundary between the small-diameter portion 30 and the large-diameter portion 32. When the joint connectors 36 are brought into phase with the inlet holes 38, i.e., when the joint connectors 36 are brought into alignment with the inlet holes 38, i.e., upon rotation of the inner tubular member 26, the joint connectors 36 are brought into fluid communication with the first inner hole 40 through the inlet holes 38.

The large-diameter portion 32 is surrounded by an outer tubular member 42 with a bearing 44 interposed between the large-diameter portion 32 and the outer tubular member 42. The bearing 44 prevents the outer tubular member 42 from rotating in unison with the inner tubular member 26 when the inner tubular member 26 is rotated by the motor 12.

The large-diameter portion 32 is of a hollow structure. Specifically, the large-diameter portion 32 has a second inner hole 46 defined therein which is larger in diameter than the first inner hole 40.

The second inner hole 46 has a circular opening at its end facing the workpiece holder 14. A hollow shaft 50 has an end inserted in the first inner hole 40 and an opposite end portion projecting coaxially from the circular opening of the second inner hole 46. The workpiece holder 14, which is of a hollow structure, includes a flange 52 having an annular ridge 54 on an end surface thereof which is inserted in the circular opening of the second inner hole 46.

The flange 52 has a through hole 56 defined therein. A closure member 58 disposed in the workpiece holder 14 includes a small-diameter closing part 60 fitted in the through hole 56. The small-diameter closing part 60 has a bottomed hole 62 defined centrally therein. The end portion of the hollow shaft 50 which projects from the circular opening of the second inner hole 46 has its distal end fitted in the bottomed hole 62.

The distal end of the hollow shaft 50 which is fitted in the bottomed hole 62 has a plurality of, e.g., eight, outlet holes 64 defined therein which extend from an inner circumferential surface to outer circumferential surface of the distal end of the hollow shaft 50. The outlet holes 64 are held in fluid communication with a plurality of, e.g., eight, passageways 66, respectively, which are defined in and extend radially through the closing part 60.

As shown in FIGS. 1 and 2, the workpiece holder 14 includes, in addition to the flange 52, an annular side wall 68 projecting axially from an end surface of the flange 52 which faces away from the annular ridge 54. The workpiece holder 14 is thus of a bottomed hollow cylindrical shape. The flange 52 is axially interposed between a large-diameter disk 70 of the closure member 58 and an end surface of the inner tubular member 26, and is fastened to the inner tubular member 26 by connecting bolts 72. Therefore, when the inner tubular member 26 is rotated by the motor 12, the workpiece holder 14 also rotates about its own axis.

The flange 52 has a plurality of, e.g., eight, first coolant passages 74 defined radially therein. The annular side wall 68 of the workpiece holder 14 has a plurality of, e.g., eight, second coolant passages 76 defined longitudinally, i.e., axially, therein. The first coolant passages 74 and the second coolant passages 76 are held in fluid communication with each other and extend substantially perpendicularly to each other.

Figure 3:
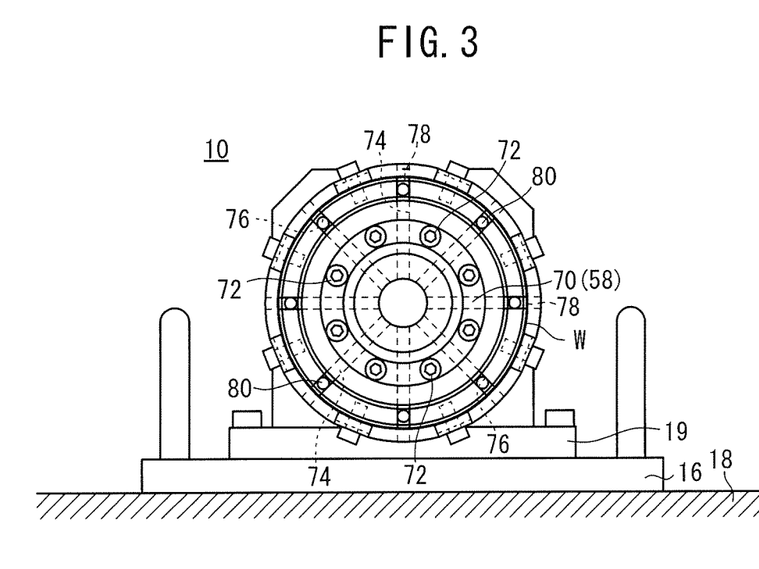
FIG. 3 is a front elevational view of the apparatus for cutting a hollow cylindrical workpiece shown in FIG. 1.

The annular side wall 68 of the workpiece holder 14 also has a plurality of branch passageways 78 that are held in fluid communication with the second coolant passages 76 and are open at the outer surface of the annular side wall 68. As shown in FIGS. 1 through 3, the branch passageways 78 extend substantially perpendicularly to the second coolant passages 76 and are open at the outer surface of the annular side wall 68. The second coolant passages 76 have axial open ends sealed by respective seal members 80 (see FIGS. 1 and 2).

Figure 4:
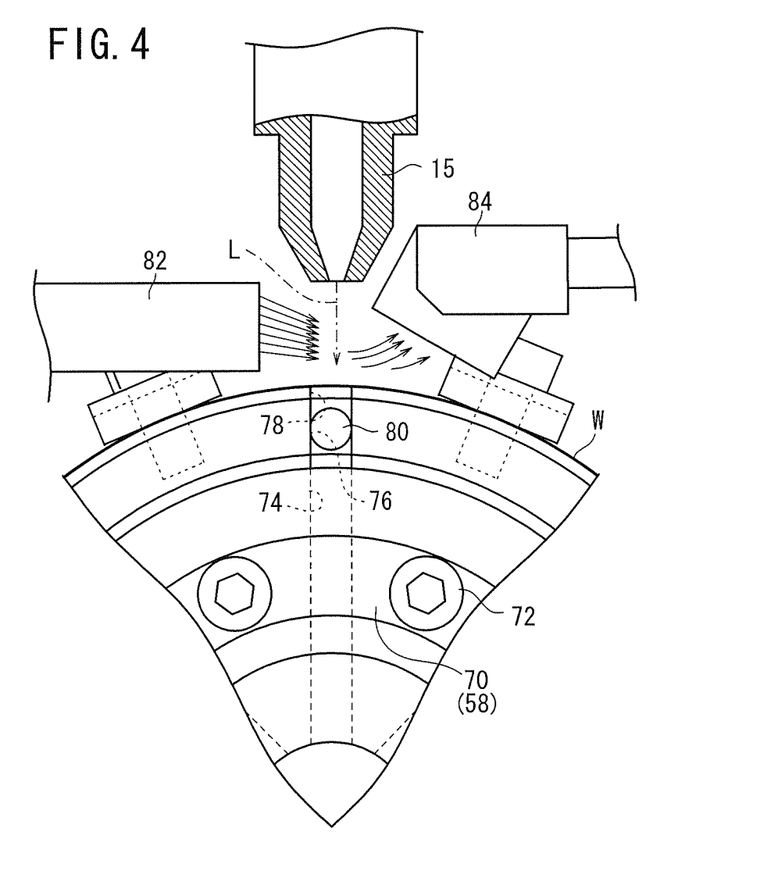
FIG. 4 is an enlarged fragmentary front elevational view of a discharge nozzle and a suction nozzle of the apparatus for cutting a hollow cylindrical workpiece shown in FIG. 1.

As shown in FIG. 4, the apparatus 10 also includes a discharge nozzle 82 (carrier medium discharge means), serving as a discharge mechanism, for discharging a carrier medium such as an argon gas, a nitrogen gas, compressed air, or the like, and a suction nozzle 84 (suction means), serving as a suction mechanism, for drawing in a coolant. The discharge nozzle 82 and the suction nozzle 84 are disposed in confronting relation to each other in the vicinity of an outer circumferential surface of the hollow cylindrical workpiece W that is fitted over the workpiece holder 14.

The apparatus 10 for cutting the hollow cylindrical workpiece W according to the present embodiment is basically constructed as described above. Operation and advantages of the apparatus 10 will be described below.

For manufacturing metal rings to produce power transmitting belts for use in continuously variable transmissions, a rectangular thin sheet of metal is cut out and then curved, and the opposite ends of the rectangular thin sheet of metal are joined to form a hollow cylindrical workpiece W. Generally, the rectangular thin sheet of metal has a thickness ranging from 0.3 to 0.35 mm, and is preferably of maraging steel.

For slicing the hollow cylindrical workpiece W, the annular side wall 68 of the workpiece holder 14 is inserted into the through hole defined in the hollow cylindrical workpiece W. At this time, a slight clearance is present between the annular side wall 68 and the inner circumferential surface of the hollow cylindrical workpiece W.

Then, the motor 12 is energized to start rotating the rotational shaft 22 about its own axis. The rotation of the rotational shaft 22 causes the inner tubular member 26 whose shaft 28 is fitted in the joint 24 and the workpiece holder 14 supported by the inner tubular member 26 to start rotating about their own axes. Preferably, the motor 12 has its rotational drive forces set to rotate the workpiece holder 14 at a peripheral speed in the range from 740 to 2000 m/minute. As described above, since the bearing 44 is interposed between the inner tubular member 26 and the outer tubular member 42, the outer tubular member 42 is not rotated by the inner tubular member 26. The pipe joint socket 34 is not rotated either as it is slidably fitted over the small-diameter portion 30.

At the same time, the discharge mechanism and the suction mechanism are actuated to discharge the carrier medium such as compressed air from the discharge nozzle 82 and drawn in through the suction nozzle 84. Since the discharge nozzle 82 and the suction nozzle 84 are disposed in confronting relation to each other, the carrier medium flows from the discharge nozzle 82 to the suction nozzle 84.

Then, the apparatus 10 starts being supplied with a coolant. Specifically, the coolant flows through the pipes connected to the pipe joints (not shown) into the joint connectors 36 of the pipe joint socket 34. When the inlet holes 38 of the inner tubular member 26 which is rotating are aligned with the respective joint connectors 36, i.e., when the inlet holes 38 are brought into phase with the joint connectors 36, the coolant flows from the joint connectors 36 through the inlet holes 38 into the first inner hole 40.

The coolant then flows through the first inner hole 40, the hollow shaft 50, the outlet holes 64, the passageways 66, the first coolant passages 74, and the second coolant passages 76 into the branch passageways 78, from which the coolant flows into the clearance between the annular side wall 68 and the inner circumferential surface of the hollow cylindrical workpiece W, producing a coolant film in the clearance. When the coolant reaches the annular side wall 68 of the workpiece holder 14, the annular side wall 68 functions as a chiller of excellent cooling efficiency.

The coolant may be in the form of a liquid such as water or the like or a gas such as compressed air or the like. However, water is more preferable as the coolant because it has good cooling efficiency and is low in cost. If the coolant comprises water, then a liquid film is formed in the clearance between the annular side wall 68 of the workpiece holder 14 and the inner circumferential surface of the hollow cylindrical workpiece W. In the present embodiment, it is assumed that the coolant comprises water, and a liquid film is formed in the clearance between the annular side wall 68 of the workpiece holder 14 and the inner circumferential surface of the hollow cylindrical workpiece W.

Then, the machining head 15, which is positioned at the end of the hollow cylindrical workpiece W remote from the flange 52, applies the laser beam L to the hollow cylindrical workpiece W. In the present embodiment, the laser beam L is applied to the hollow cylindrical workpiece W at successive positions which are essentially in alignment with the branch passageways 78. Specifically, the machining head 15 (laser beam applying means) is stopped at a position aligned with an annular array of the branch passageways 78 for applying the laser beam L to the hollow cylindrical workpiece W.

When the laser beam L is applied to the hollow cylindrical workpiece W at a position which is essentially in alignment with an annular array of the branch passageways 78, since the hollow cylindrical workpiece W is rotating with the workpiece holder 14, an annular region of the hollow cylindrical workpiece W is heated to a high temperature by the applied laser beam L and melted, separating a metal ring off the remainder of the hollow cylindrical workpiece W along the annular region of the hollow cylindrical workpiece W. When the annular region of the hollow cylindrical workpiece W is melted, the metal (e.g., maraging steel) thereof sublimes, producing a sublimed metal gas. If the hollow cylindrical workpiece W is made of a metal other than maraging steel, e.g., stainless steel or any of various other metals, it also produces a sublimed metal gas when it is melted.

If the workpiece holder 14 rotates at a peripheral speed in the range from 740 to 2000 m/minute, then the hollow cylindrical workpiece W is supplied with a sufficient level of laser beam energy to cut the hollow cylindrical workpiece W, or in other words, the hollow cylindrical workpiece W is easily cut into metal rings. In the above rotational speed range, the amount of sublimed metal gas which is produced per unit time is large, and the amount of molten metal which is produced per unit time is small. The reasons for the large amount of sublimed metal gas and small amount of molten metal are as follows:

Since the hollow cylindrical workpiece W is rotating, the laser beam L is intermittently applied to any one spot in the annular region of the hollow cylindrical workpiece W that is to be heated. This is because any spot to which the laser beam L is applied moves away from the laser beam L immediately after the laser beam L is applied as the hollow cylindrical workpiece W rotates continuously.

The energy density of a general laser beam L is higher at the center of the laser beam spot and lower at the edge of the laser beam spot. In other words, the laser beam L has an energy density distribution. Therefore, the area of the hollow cylindrical workpiece W where the center (higher energy density) of the applied laser beam spot is positioned is more likely to sublime, and the area of the hollow cylindrical workpiece W where the edge (lower energy density) of the applied laser beam spot is positioned is less likely to sublime.

If the workpiece holder 14 rotates at a peripheral speed in the range from 740 to 2000 m/minute, then the region of the hollow cylindrical workpiece W where the center of the applied laser beam spot is positioned sublimes instantaneously, producing a sublimed metal gas, and the region of the hollow cylindrical workpiece W where the edge of the applied laser beam spot is positioned has its temperature remaining below the melting point though it rises. As the hollow cylindrical workpiece W rotates continuously, the latter region of the hollow cylindrical workpiece W quickly moves away from the laser beam L and hence its temperature does not rise beyond the melting point. Consequently, this region of the hollow cylindrical workpiece W is not melted and hence is prevented from producing dross.

When the hollow cylindrical workpiece W makes two or more revolutions upon continued rotation, the center of the applied laser beam spot is applied to the latter area of the hollow cylindrical workpiece W, which is then caused to sublime. Inasmuch as this phenomenon occurs along an annular region of the hollow cylindrical workpiece W to which the laser beam L is continuously applied as the hollow cylindrical workpiece W rotates, the annular region is melted away, cutting a metal ring off the hollow cylindrical workpiece W along the annular region.

The sublimed metal gas that is produced from the hollow cylindrical workpiece W is drawn almost in its entirety by the suction nozzle 84 (see FIG. 4). Therefore, the sublimed metal gas is prevented from being attached to the hollow cylindrical workpiece W and hence dross is prevented from being produced from the hollow cylindrical workpiece W.

The annular side wall 68 of the workpiece holder 14 functions as a chiller of excellent cooling efficiency when it is supplied with the coolant (water) from the second coolant passages 76. As a result, the portion of the hollow cylindrical workpiece W other than the annular region to which the laser beam L is applied is prevented by the annular side wall 68 from increasing in temperature, and hence from being melted and producing dross.

In addition, the liquid film is formed in the clearance between the annular side wall 68 of the workpiece holder 14 and the inner circumferential surface of the hollow cylindrical workpiece W. Even if molten metal and dross are produced from the hollow cylindrical workpiece W, they tend to be adsorbed by the liquid film.

When the hollow cylindrical workpiece W is cut along the molten annular region thereof, since the laser beam L is applied essentially in alignment with an annular array of the branch passageways 78, those branch passageways 78 are exposed and the liquid film leaks out. The leaking liquid film is then scattered away under centrifugal forces because the workpiece holder 14 is rotating.

Since the leaking liquid film is scattered away, any molten metal and dross which may be contained in the liquid film are efficiently removed from the cut edge of the hollow cylindrical workpiece W.

At this time, the discharge nozzle 82 is discharging the carrier medium such as compressed air and the suction nozzle 84 is drawing in. At this time, since the carrier medium flows toward the suction nozzle 84, the liquid film that is scattering away is carried by the carrier medium toward the suction nozzle 84. Consequently, the liquid film is efficiently removed and carried to the suction nozzle 84 by the carrier medium.

While the hollow cylindrical workpiece W is being cut by the laser beam L, substances such as a sublimed metal gas and a molten metal that are generated in cutting portions are also carried by the carrier medium toward the suction nozzle 84. As a consequence, the cut edge of the hollow cylindrical workpiece W is kept clean.

Figure 5:
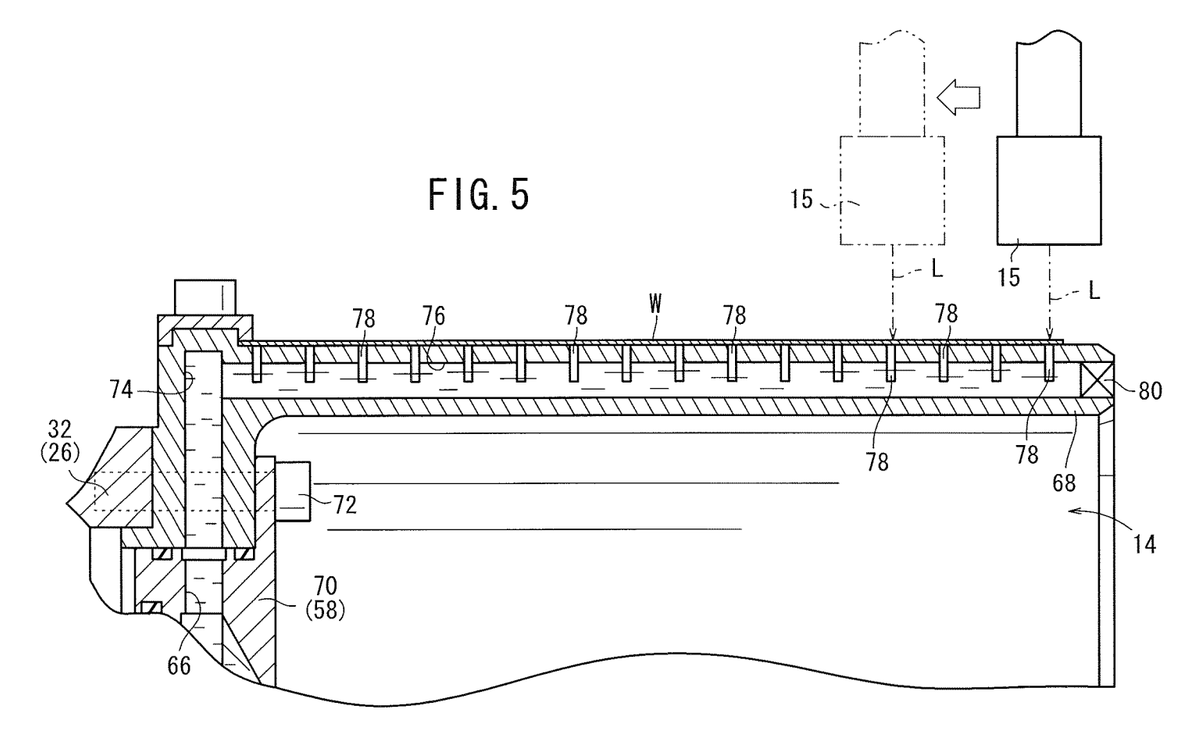
FIG. 5 is an enlarged fragmentary side elevational view showing the manner in which a machining head is moved.

After a metal ring is severed from the hollow cylindrical workpiece W, the machining head 15 is moved to the two-dot-and-dash-line position shown in FIG. 5, and then applies the laser beam L to the hollow cylindrical workpiece W at another position while the hollow cylindrical workpiece W is rotating. At this time, the laser beam L is applied to the hollow cylindrical workpiece W essentially in alignment with another annular array of the branch passageways 78, cutting a metal ring off the hollow cylindrical workpiece W in the same manner as described above.

In the above embodiment, water is illustrated as the coolant. However, a gas such as compressed air or the like may be used as the coolant. If a gas is used as the coolant, then a gas film is formed in the clearance between the annular side wall 68 of the workpiece holder 14 and the inner circumferential surface of the hollow cylindrical workpiece W. The gas film also functions to remove the molten metal and dross efficiently from the cut edge of the hollow cylindrical workpiece W.

The carrier medium discharged from the discharge nozzle 82 may comprise a liquid such as water or the like. If the carrier medium comprises a liquid, then the cut edge of the hollow cylindrical workpiece W can be cooled more efficiently and can also be kept cleaner.

The workpiece holder 14 may comprise a solid body instead of the annular side wall 68.

The laser beam L may not necessarily be applied to a position aligned with any annular array of the branch passageways 78. Even if the laser beam L is applied to a position which is out of alignment with any annular array of the branch passageways 78, the liquid film or the gas film is not prevented from leaking out from the cut edge of the hollow cylindrical workpiece W.

Although a certain preferred embodiment of the present invention has been shown and described in detail, it should be understood that various changes and modifications may be made therein without departing from the scope of the appended claims.

What is claimed is:

1. An apparatus for cutting a hollow cylindrical workpiece of metal with a laser beam to produce a plurality of metal rings, comprising:
   a rotatable workpiece holder for holding the hollow cylindrical workpiece thereon, the rotatable workpiece holder having a side wall insertable in a through hole of the hollow cylindrical workpiece and functioning as a chiller for cooling the hollow cylindrical workpiece when the side wall is inserted in the through hole of the hollow cylindrical workpiece, the workpiece holder having a coolant passage defined longitudinally therein for passing a coolant therethrough along the side wall and a plurality of branch passageways which extend from the coolant passage to an outer surface of the side wall;

whereby the coolant cools the hollow cylindrical workpiece to be cut by the laser beam when the coolant flows from the coolant passage through the branch passageways between the outer surface of the side wall and an inner circumferential surface of the hollow cylindrical workpiece.

2. An apparatus according to claim 1, further comprising laser beam applying means which is stopped at a position aligned with an annular array of the branch passageways for applying the laser beam to the hollow cylindrical workpiece to cut the hollow cylindrical workpiece at the position by the laser beam.

3. An apparatus according to claim 1, wherein the workpiece holder rotates at a peripheral speed in a range from 740 to 2000 m/minute when the hollow cylindrical workpiece is cut by the laser beam.

4. An apparatus according to claim 1, further comprising suction means for drawing in the coolant which leaks out from a cut edge of the hollow cylindrical workpiece when the hollow cylindrical workpiece is cut by the laser beam.

5. An apparatus according to claim 4, further comprising carrier medium discharge means for discharging a carrier medium which carries the coolant which leaks out from the cut edge of the hollow cylindrical workpiece, toward the suction means.

6. An apparatus according to claim 5, wherein the carrier medium comprises a compressed gas or water.

7. An apparatus according to claim 1, wherein the coolant forms a film between the outer surface of the side wall of the workpiece holder and an inner circumferential surface of the hollow cylindrical workpiece.

8. An apparatus according to claim 1, wherein the coolant comprises water.

* * * * *